Patented Sept. 24, 1929

1,729,351

UNITED STATES PATENT OFFICE

AXEL RUDOLF LINDBLAD, OF DJURSHOLM, SWEDEN

METHOD OF TREATING ARSENIOUS ORE

No Drawing. Application filed December 2, 1927, Serial No. 237,345, and in Sweden July 7, 1927.

In the roasting and treating generally of arsenious ore such large quantities of arsenious acid are sometimes obtained that there are difficulties in selling the same. It may also sometimes happen that the arsenious acid obtained has been fouled by selenium or other substances to such a degree that the product for that reason is unsalable. As the arsenious acid cannot be thrown away without any further ado on account of its great poisonousness, there exists therefore a need of being able to transfer the same in an insoluble form, or at least a form difficult of dissolution, and therefore innocuous, so that the same without any troublesome and expensive precautionary measures can be stored or thrown away.

The present invention refers to a method which enables this, and is characterized by the arsenious acid being roasted together with lime or calcareous material so as to form arseniate. This arseniate is then melted down, an insoluble bloom, or at least one difficult of dissolution, being obtained. This is especially the case if a superabundance of lime has been added, so that the smelted calcium arseniate is basic. A still safer method for attaining the desired result is in the smelting of the calcium arseniate to add a proper amount of substances containing silicious acid, e. g. slag obtained in the smelting of the arsenious ore. The slag must, of course, be sufficiently basic or also a sufficient quantity of basic substances must be added on smelting, as otherwise the arsenious acid to a greater or lesser extent is expelled. The slag-like product which is obtained in this process of smelting together calcium arseniate and the aforesaid furnace slag in suitable proportions, is remarkably constant and insensible to the influence of both water and carbonic acid and air, and can therefore be stored in the open air without any risk.

In order to make the invention more clear, the following statement is given by way of example.

A quantity of arsenious acid or a like arsenious compound obtained in the form of powder in the roasting of arsenious ores in the usual manner is mixed with about half its weight of burnt or slaked lime and the mixture heated in the presence of air to about 500° C. When thus heated the lime combines with the arsenious acid to form an arseniate and smaller amounts of arsenite. The pulverulent mass thus obtained is then smelted with a basic slag or other silicates. The mass thus obtained as a result of the smelting process is substantially soluble and may be thrown away with the slag without causing any dangerous consequences.

Having thus described my invention I declare that what I claim is:—

1. A method of treating arsenious acid obtained during the ordinary roasting of arsenious ore, which comprises roasting the arsenious acid together with a quantity of calcareous material to form an arseniate, and then smelting the arseniate.

2. A method of treating arsenious acid obtained during the ordinary roasting of arsenious ore, which comprises roasting the arsenious acid together with a quantity of calcareous material to form an arseniate, and then smelting the arseniate, the quantity of calcareous material employed being such that the smelting produces a basic and substantially insoluble bloom.

3. A method of treating arsenious acid obtained during the ordinary roasting of arsenious ore, which comprises roasting the arsenious acid together with a quantity of calcareous material to form an arseniate, adding substances containing silicious acid to the arseniate, and smelting the resulting mixture.

4. A method of treating arsenious acid obtained during the ordinary roasting of arsenious ore, which comprises roasting the arsenious acid together with a quantity of calcareous material to form an arseniate, adding to the arseniate a quantity of slag obtained in the roasting of arsenious ore, and smelting the mixture of arseniate and slag.

In witness whereof I affix my signature.

AXEL RUDOLF LINDBLAD.